(12) United States Patent
Hara et al.

(10) Patent No.: US 7,210,795 B2
(45) Date of Patent: *May 1, 2007

(54) LIGHT QUANTITY ADJUSTING DEVICE AND PROJECTOR APPARATUS USING THE SAME

(75) Inventors: Toyoyuki Hara, Kai (JP); Masahide Shirasu, Kai (JP); Yukihiko Hayakawa, Koufu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 255 days.

This patent is subject to a terminal disclaimer.

(21) Appl. No.: 11/060,527

(22) Filed: Feb. 18, 2005

(65) Prior Publication Data

US 2005/0264770 A1    Dec. 1, 2005

(30) Foreign Application Priority Data

| May 31, 2004 | (JP) | ............................. 2004-161063 |
| May 31, 2004 | (JP) | ............................. 2004-161064 |
| May 31, 2004 | (JP) | ............................. 2004-161065 |

(51) Int. Cl.
*G03B 21/14* (2006.01)
*G03B 21/22* (2006.01)

(52) U.S. Cl. .................. 353/88; 353/97; 353/119; 359/230; 359/234; 396/510

(58) Field of Classification Search .................. 353/97, 353/119, 88; 359/230, 234; 396/510
See application file for complete search history.

(56) References Cited

U.S. PATENT DOCUMENTS

| 6,554,502 | B2 * | 4/2003 | Naganuma ................... 396/454 |
| 7,085,032 | B2 * | 8/2006 | Sato ............................ 359/230 |
| 2003/0063264 | A1 * | 4/2003 | Watanabe et al. ............. 353/97 |
| 2006/0203210 | A1 * | 9/2006 | Shirasu et al. ................ 353/97 |

FOREIGN PATENT DOCUMENTS

JP    2003-241311    8/2003

* cited by examiner

*Primary Examiner*—Melissa Jan Koval
(74) *Attorney, Agent, or Firm*—Manabu Kanesaka

(57) ABSTRACT

A light quantity adjusting device for adjusting light quantity of a projector apparatus. The adjusting device includes a substrate having an optical path opening and a blade guide surface having level differences in a direction perpendicular to the optical path; a plurality of blade members arranged at a circumferential edge of the optical path opening for rotating along the blade guide surface in an inclined state with respect to the optical path; and a plurality of pins disposed on the substrate for supporting base end portions of the blade members to rotate around the base end portions for opening and closing the optical path opening. A transmission member is mounted on the substrate for engaging the blade members, and a drive device drives the transmission member to rotate the blade members to open and close the optical path opening.

20 Claims, 17 Drawing Sheets t1<t2

LIGHT QUANTITY ADJUSTING DEVICE AND PROJECTOR APPARATUS USING THE SAME

BACKGROUND OF THE INVENTION AND RELATED ART STATEMENT

The present invention relates to a light quantity adjusting device for adjusting brightness of an image when a light source irradiates an image formed by image forming means such as a Braun tube or a liquid crystal panel so that the image is projected on a screen through a projecting lens. The present invention also relates to a projector apparatus using the light quantity adjusting device.

In a projector apparatus, an image such as a symbol and a picture is formed on an image forming unit such as a Braun tube (i.e., CRT) or a liquid crystal panel, and a light source such as a halogen lamp irradiates the image, so that a projecting lens projects the image on a screen. The projector apparatus projects a still image such as a symbol image on a screen for a presentation, or a motion picture on a screen of a home theater.

When the projector apparatus is used for a presentation or movie, an environment significantly affects a vision of a viewer depending on a bright room or a dark room. For example, when an image with low luminance is projected in a bright room, it is difficult to obtain a clear image. In contrast, when an image with high luminance is projected in a dark room, the image looks too bright. Further, when luminance of an image changes greatly and repeatedly for long time, i.e., from a dark screen to a bright screen, it is possible to pose a risk of fatigue of eyes or an optical stimulus. In particular, when the projector apparatus for a presentation requiring high luminance is used for a home theater, an image becomes too bright and a user may suffer eye fatigue.

Accordingly, it is necessary to properly adjust brightness of an image to be projected on a screen. When an image is projected in a dark room, it is necessary to reduce quantity of light. When an image becomes repeatedly bright and dark, for example, an image changes bright and dark for every one several tenth second, a viewer may suffer eye fatigue and receive an optical stimulus, thereby causing a physical problem. Accordingly, it is necessary to adjust the quantity of light for every frame of continuous images for reducing the stimuli on the eyes.

Japanese Patent Publication (Kokai) No. 2003-241311 has disclosed a device for adjusting light quantity. In the reference, light from a light source is divided into three primary colors R, G and B through a dichroic mirror. When light is irradiated on an image forming panel such as a liquid crystal panel, a light quantity reducing device is arranged between the light source and the dichroic mirror.

In the projector apparatus disclosed in the reference, light from the light source lamp is divided into the three primary colors R, G and B, and the primary colors are irradiated on the image forming panel formed of the liquid crystal panel. A projecting lens focuses light passing through the panel and projects an image on an outside screen. As a method of forming an image, other than the liquid crystal panel, there is known a method (a CRT projector) in which the Braun tube emits scanning lines or a digital imaging method (a digital light processing projector) in which fine mirror surfaces transform beams of the three primary colors R, G and B into scanning lines.

In the light quantity reducing device, a substrate having an optical path opening aligned with a center of an optical axis is arranged in an optical path from the light source to the mirror. A plurality of blades is sequentially overlapped at a circumferential edge of the optical path opening of the substrate, and is arranged to be rotatable. The blades are attached to the circumferential edge of the optical path opening with a predetermined spacing, and contour edge portions thereof are overlapped in a scale shape. Further, the blades are arranged such that leading end portions thereof face the optical path opening. When the blades rotate around end portions thereof, the leading end portions cover the optical path opening from a large aperture to a small aperture. Such a structure is widely known as a light quantity adjusting device for a camera.

However, the following problems may occur when such a structure widely known in a camera device, in which the plural blades arranged around the optical path opening and rotate to adjust an aperture of the optical path opening, is adopted in a projector apparatus such as a projector. In the camera device, when the blades for adjusting light quantity are opened and closed at a relatively low speed for preparing for shooting a picture, an image to be taken is hardly influenced. Also, similar to shutter blades, even if the blade members slide each other and generate an operation sound such as a clanking noise upon the opening/closing operation, there is no serious problem.

However, in the projector apparatus, when the light quantity adjusting blades are opened and closed (operated) and generate an operation sound, there may be a serious influence on an environment of a meeting or movie. In particular, when the blade members are made of thin metal sheets, it is possible to generate a large metallic noise. When the blades are operated for reducing luminance change of each image changing every 1/60 second, for example, it is necessary to move the blade members at a speed of several hundredth second. Accordingly, the operation sound of the blades is repeated all the time, thereby making a user uncomfortable. When the blades are operated at a lower speed to reduce the noise, it is difficult to adjust the light quantity to a change in an image, thereby causing image flickering.

In view of the problems described above, an object of the present invention to provide a light quantity adjusting device with a simple structure and a low price, in which it is possible to reduce an operation sound due to contact of a plurality of blades and adjust light quantity at a high speed when the blades adjust the light quantity in an optical path from a light source to a projecting lens through a large or small aperture.

Another object of the present invention is to provide a projector apparatus using the light quantity adjusting device.

Further objects and advantages of the invention will be apparent from the following description of the invention.

SUMMARY OF THE INVENTION

In order to obtain the objects described above, according to the present invention, a light quantity adjusting device includes a substrate having an optical path opening and arranged in a direction substantially perpendicular to a projection optical path. A plurality of blade members is disposed on the substrate, and is sequentially overlapped at a circumferential edge of the optical path opening. The blade members are thin sheets formed of a resin or metal. A suitable number such as two, five, or six of the blade members are arranged at the circumferential edge of the opening with a predetermined spacing. The blade members are overlapped at adjoining edge portions thereof.

The blade members are rotatably supported on fulcrums such as pins disposed on the substrate, and are connected to a drive device such as a drive motor through a transmission member attached to the substrate. The transmission member includes various structures, and may have a structure in which a ring-shaped transmission member is rotatably supported on the circumferential edge of the optical path opening of the substrate. In the structure, the blade members are rotatably supported at the end portions thereof on the fulcrum pins, and the leading end portions thereof face the optical path opening. The drive device rotates the blade members.

The substrate is provided with a blade guide surface for guiding the blade members to rotate. The blade guide surface is formed of an inclined surface or a step surface having a step in a direction perpendicular to the projection optical path. Accordingly, the blade members rotate along the blade guide surface in a state inclined by a predetermined angle with respect to the optical path. With the inclined state, a small gap is formed between the overlapped blades, thereby reducing frictional force. Accordingly, it is possible to reduce operation sound of the blade members and wear due to friction. The guide surface includes a first contact surface formed on the circumferential edge of the fulcrum pin for supporting the blade member at a high position and a second contact surface formed on the circumferential edge of the optical path opening for supporting the blade member at a low position.

In other words, the substrate is provided with the first and second contact surfaces positioned on a circle concentric with the optical path opening and having a step shape. The first contact surface guides the blade member in an inclined state with respect to the optical path direction at a position higher than the second contact surface does. As a result, the blade members arranged around the optical path opening with the predetermined spacing are overlapped at different positions from the fulcrum pins rotatably supporting the blade members. Accordingly, even if the first contact surface and the second contact surface for supporting the blade members are at an equal level, it is possible to reduce contact between the blade members or form a small gap therebetween.

A protrusion may be formed on the blame member for forming a small gap between the blade members. Accordingly, when the blade members are curved or deformed, it is still possible to form the small gap between the blade members, thereby reducing wear and operation sound.

DETAILED DESCRIPTION OF PREFERRED EMBODIMENTS

Hereunder, embodiments of the present invention will be described with reference to the accompanying drawings.

Figure 1:
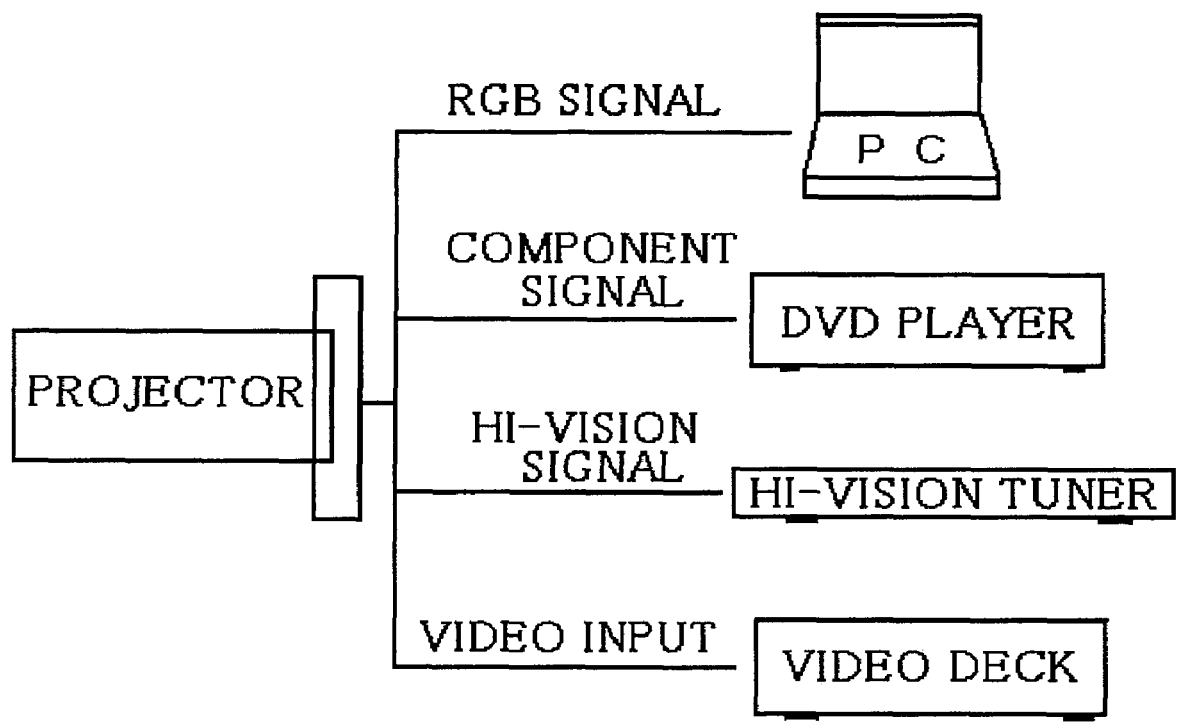
FIG. 1 is an explanatory diagram showing a system configuration of a projector apparatus according to an embodiment of the present invention.

First, a projector apparatus provided with a light quantity adjusting device of the invention will be described. FIG. 1 is an explanatory diagram showing a system configuration of a projector apparatus according to an embodiment of the present invention, and FIG. 2 is a schematic diagram of the projector apparatus according to the embodiment of the present invention.

A method of inputting images to a projector employs RGB signals, component signals, Hi-Vision signals, video signals and so on. The RGB signals are transmitted from the image output terminal of a computer, for example, to the projector. The component signals are transmitted to a DVD player. The Hi-Vision signals are transmitted to a tuner such as a Hi-Vision TV. The video signals are transmitted from the output terminal of a video deck or the like to a projector device. As the projector device, there are known various ones, one example of which is shown in FIG. 2 in case a liquid crystal panel is used as an image forming unit (or image forming means).

Figure 2:
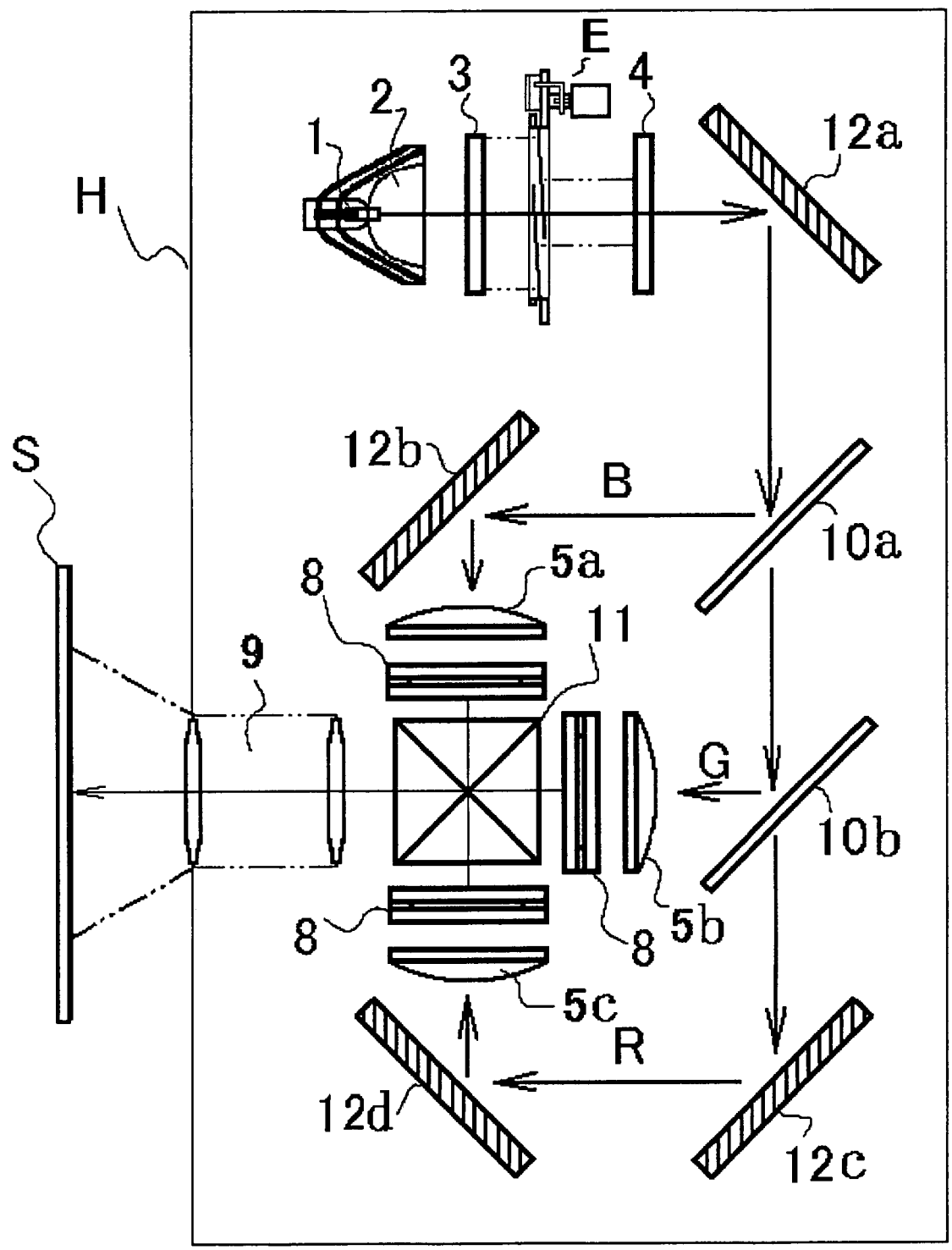
FIG. 2 is a schematic diagram of the projector apparatus according to the embodiment of the present invention.

In FIG. 2, symbol H designates a projector, and symbol S designates a screen for projecting an image. The projector H is provided with a projecting light source 1, which is exemplified by a light source lamp such as a metal halide lamp, a high-pressure mercury lamp, an NSH lamp, a xenon lamp or a VIP lamp. The light emitted from the light source 1 is reflected into a generally parallel light by a reflecting mirror 2 having an objective face, and detrimental/unnecessary infrared ray and ultraviolet ray are cut by a filter 3. After this, the light is adjusted to an optimum brightness by a light quantity adjusting device E.

Light passes through an integrator lens 4 for improving condensation efficiency and a peripheral light quantity ratio, and is bent substantially at a right angle by a reflecting mirror 12a. The light is divided by a dichroic mirror into three primary colors R, G and B. At first, the light is reflected and separated into the B light by a dichroic mirror 10a, which is characterized to reflect only the B light while transmitting the G light and the R light, and is guided through a reflecting mirror 12b into a condenser lens 5a. The condensed light passes through a liquid crystal panel 8 so that it arrives as the image of the B light at a synthetic prism 11.

Moreover, the G light and R light having passed through the dichroic mirror 10a of the first stage are reflected and separated into the G light by a dichroic mirror 10b of a second stage, which is characterized to reflect the G light while transmitting the R light. The G light is condensed into a parallel light by a condenser lens 5b, and arrives as the image of the G light at the synthetic prism 11.

Moreover, the R right having passed through the dichroic mirror 10b of the second stage is guided through two reflecting mirrors 12c and 12d into a condenser lens 5c, and passes through the liquid crystal panel 8 to arrive as the image of the R light at the synthetic prism 11. Therefore, the three primary colors R, G and B are synthesized into a color image at the synthetic prism 11, and the color image is guided into a projecting lens 9, by which it is suitably enlarged and projected on the front screen S.

Figure 3:
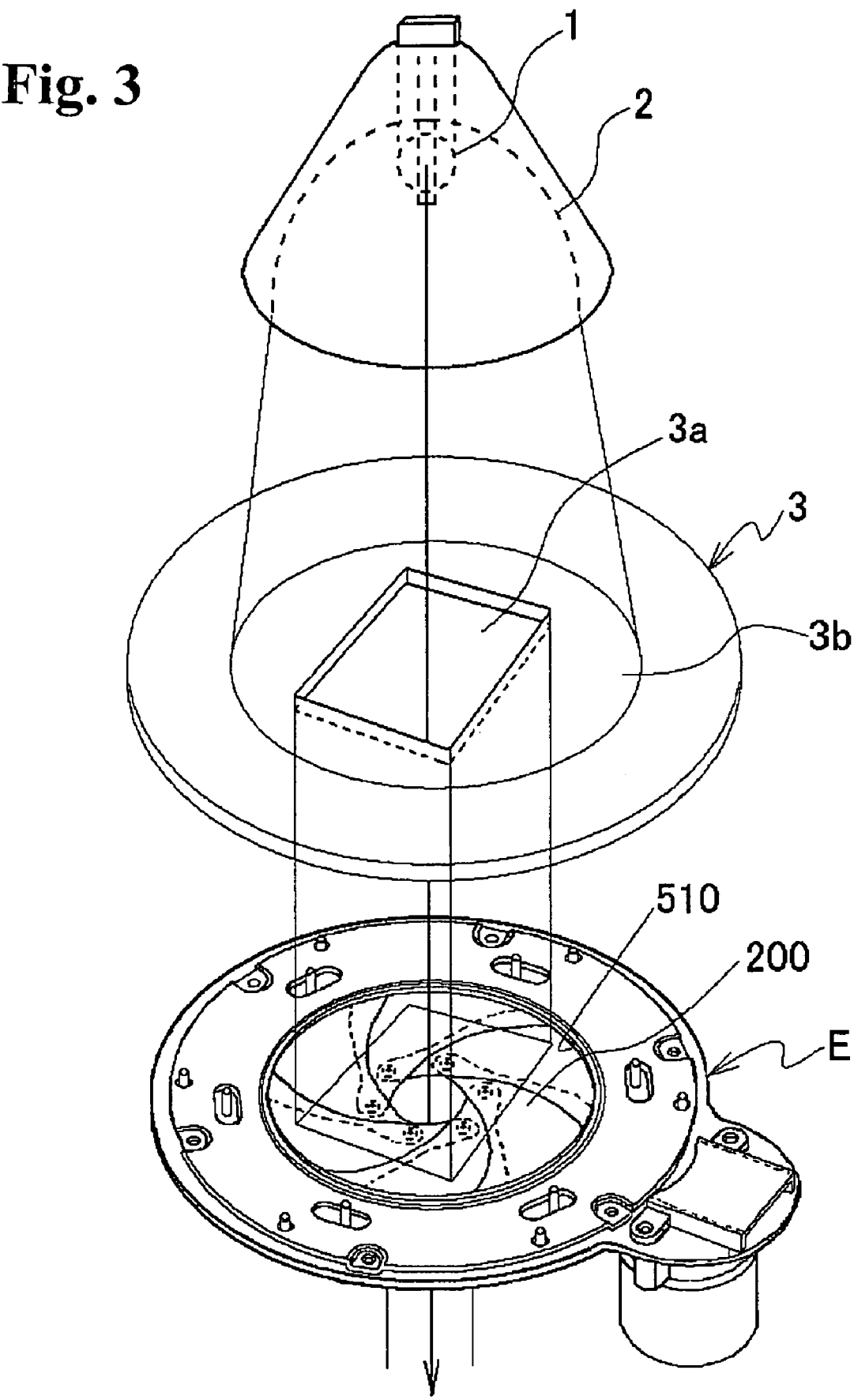
FIG. 3 is a perspective view showing a light quantity adjusting device according to an embodiment of the present invention.

With reference to FIG. 3, here will be explained the arrangement relations among the light source 1, the filter 3 and the light quantity adjusting device E. In FIG. 3, reference numeral 1 designates the light source, reference numeral 2 designates the paraboloidal reflecting mirror, reference numeral 3 designates the filter, and symbol E designates the light quantity adjusting device.

The luminous flux emitted from the light source 1 irradiates the filter 3 such that it is reflected and condensed by the paraboloidal reflecting mirror 2. The filter 3 cuts the infrared ray and the ultraviolet ray as described above, and a remaining surface thereof is coated with a reflecting coating to form a rectangular area 3a at a central portion thereof for transmitting the light.

Therefore, the luminous flux emitted is cut at its peripheral light unnecessary for the screen projection by the rectangular area 3a, and irradiates the light quantity adjusting device E. The light quantity adjusting device E has an optical path opening 510 so that light quantity adjusting means 200 is larger than the diameter at the full open time and the maximum aperture of the light quantity adjusting means 200 is made smaller than the rectangular area 3a.

Therefore, the light quantity adjusting means 200 is constructed by arranging a plurality of blade members at the optical path opening 510 to open/close them freely. The blade members are made of a metal material such as stainless steel or SK material, and are so brilliantly plated on its surface with chromium or nickel as not to absorb heat. Thus, the blade members are made of the thin metal sheet. This is because the light having passed through the rectangular area 3a is cut in its infrared ray by the filter 3 but is still at a considerably high temperature so that the blade members may be prevented from being deformed by the heat.

The light quantity adjusting device E will be described next. As shown in an exploded perspective view in FIG. 4, reference numeral 100 designates a presser plate, reference numeral 200 designates light quantity adjusting means, reference numeral 300 designates a protective cover, reference numeral 400 designates a ring plate for driving the light quantity adjusting means 200 directly, reference numeral 500 designates a bottom plate, reference numeral 600 designates an activation lever for activating the ring plate 400 in a suitable direction, and reference numeral 700 designates a drive motor (or drive device) for driving the activation lever 600. These components are sequentially laid over the bottom plate 500 acting as the substrate thereby to construct the light quantity adjusting device E.

On the substrate (bottom plate) 500 having a suitable shape such as a disc shape, more specifically, there are individually mounted the light quantity adjusting means 200 composed of the blade members, the transmission member (the ring plate) 400 for opening/closing the adjusting means 200, and the drive motor 700 for driving the transmission member 400. The presser plate 100 is mounted on the bottom plate 500. Therefore, the individual components described above are housed and held between the bottom plate 500 and the presser plate 100.

The bottom plate 500 is provided, at its center, with the optical path opening 510 and, on the outer concentric circle of the optical path opening 510, with a groove 520, on the bottom of which a protruding guide rail 525 is formed to support the ring plate (the transmission member) 400 rotatably. The bottom plate 500 is further provided with: fulcrum pins 530 which are individually embedded at equally divided positions on the outer concentric circle for providing the turning centers of the light quantity adjusting means 200; stop holes 550 formed near the individual fulcrum pins 530 at such positions for screwing the presser plate 100 so as not to obstruct the operation of the light quantity adjusting means (i.e., the blade members) 200; and a supporting portion 540 having stop holes 542 for supporting the outwardly protruding drive motor 700, a relief hole 544, and a sector slit 546, through which the operation pin 620 of the activation lever 600 penetrates. Here, the fulcrum pins 530 with the identical shape have an identical function so that their reference numerals are omitted.

The ring plate 400 is provided with an opening 410 at its center and is rotatably fitted in the groove 520 of the bottom plate 500. The ring plate 400 is further provided with: operation pins 420 embedded on the ring face at circumferentially equally divided positions for rocking the light quantity adjusting means 200; an arm 430 protruding to the side of the supporting portion 540 of the bottom plate 500; and a slit 440 formed in the leading end portion of the arm 430 for fitting therein the operation pin 620 of the later-described activation lever 600.

The light quantity adjusting means 200 is formed of the plural (i.e., six) blade members. Each blade member is provided: at its end portion, with a fitting hole 210 for fitting the fulcrum pin 530 of the bottom plate 500 for turning motions, and a slit 220 for fitting the operation pin 420 of the ring plate 400; and, at the leading end portions of the individual blade members laminated, with protrusions 230 for supporting the individual blade members at a predetermined spacing. Here, in the components shown in FIG. 4, the identical shapes have the identical functions so that their reference numerals are omitted.

The presser plate 100 is formed in a ring shape and provided at its center with an optical path opening 110 having a diameter equivalent to that of the optical path opening 510 of the bottom plate 500. The presser plate 100 is further provided with: mounting portions 120 for fixing the ring plate 400 and the light quantity adjusting means 200 on the bottom plate 500 at a predetermined spacing from the bottom plate 500 so as to hold and protect them rotatably with respect to the bottom plate 500; relief slits 130 for the operation pins 420 of the ring plate 400; and relief holes 140 for the fulcrum pins 530 of the bottom plate 500.

The activation lever 600 is provided, at its one end, with a fitting hole 610 for fitting and fixing the spindle 710 of the drive motor 700 and, at its other end, with the operation pin 620 formed at the leading end portion. The operation pin 620 is fitted in the slit 440 of the ring plate 400 to transmit the drive of the drive motor 700 to the ring plate 400.

Figure 5:
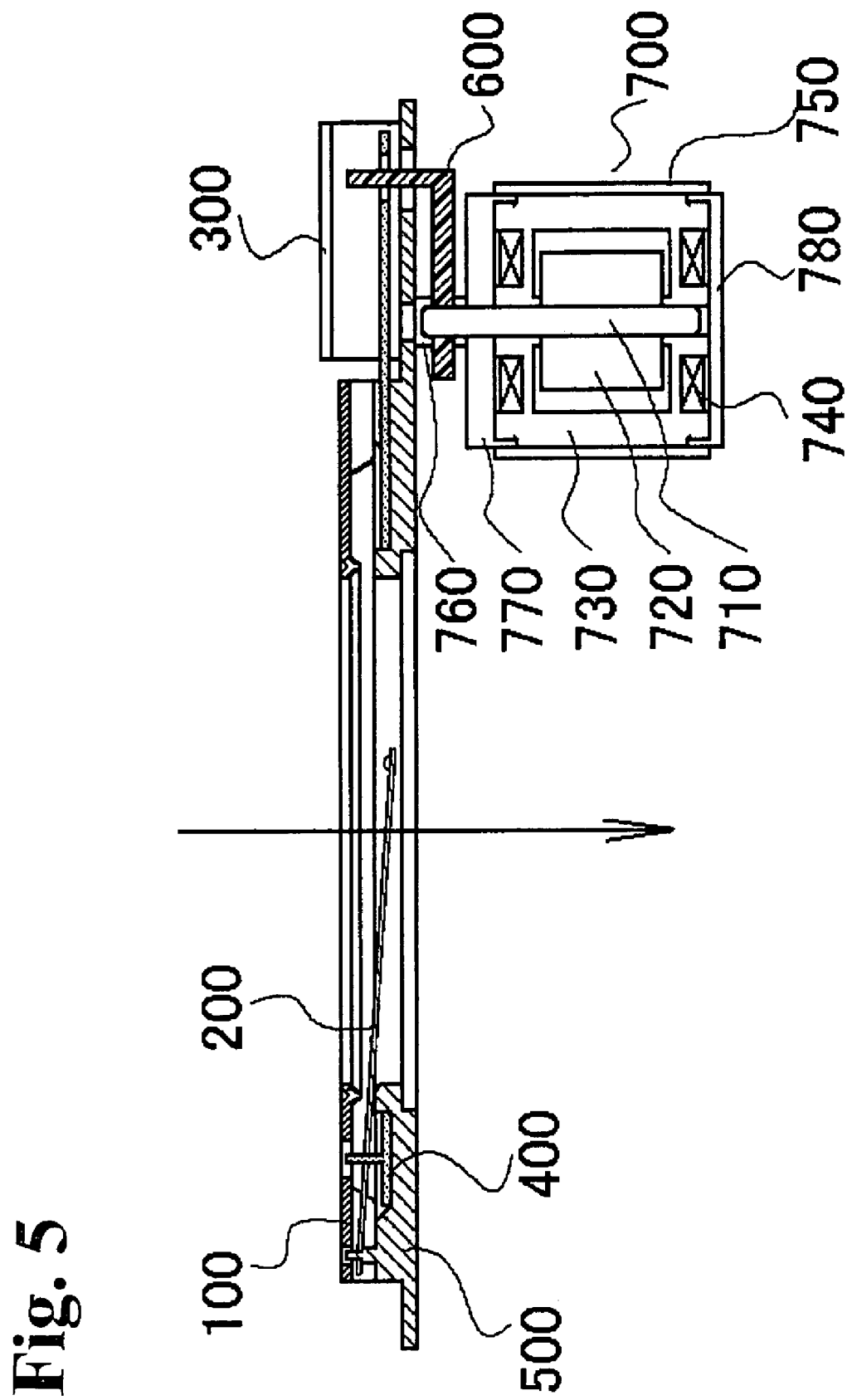
FIG. 5 is a side sectional view of the light quantity adjusting device shown in FIG. 4.

With reference to FIG. 5, the drive motor 700 is provided with: the spindle 710 fitted on the outer center of the aforementioned activation lever 600; a magnet rotor 720, through which the spindle 710 extends; a coil frame 730 split into halves vertically or transversely of the spindle 710 for supporting the magnet rotor 720 rotatably; a conduction coil 740 wound on the outer circumference of the coil frame 730; a yoke 750 for cutting the magnetic influences from the outside; covers 770 and 780; and a fixed portion 760 molded integrally with the cover 770 and fixed and supported by the bottom plate 500.

In addition, various kinds of electromagnetic motors can be adopted as the drive motor 700. In the shown motor, an exciting coil is wound around the magnet rotor 720 in a direction perpendicular to the direction of the magnetic pole of the magnetic rotor 720 so that the magnetic rotor 720 is turned a predetermined angle by the magnetic field excited by applying an electric current to the exciting coil. The magnetic rotor 720 is rotated clockwise or counter-clockwise according to the direction of the electric current applied. By winding a drive coil and a brake coil on the aforementioned coil frame 730 and by applying the electric current in opposite directions, the rotor can also be rotated by the drive coil and stopped by the brake coil. By burying a Hall element or elements in the coil frame 730 at one or more portions, moreover, the magnetic poles (or magnetic fields) of the rotor can be detected to locate the angular position of the rotor.

As a result, the blade members are turned in the predetermined direction by energizing the drive coil, and are precisely stopped at predetermined positions by energizing the brake coil with detection of their angular positions with the Hall elements. Thus, the light quantity is adjusted to large and small values by the aperture formed by the blade members.

The protective cover 300 is provided for protecting the connected relation between the arm 430 of the ring plate 400, which is not covered with the presser plate 100 but exposed, and the operation pin 620 of the activation lever 600, and is mounted on the bottom plate 500 together with the drive motor 700 by means of stop screws 310.

Figure 4:
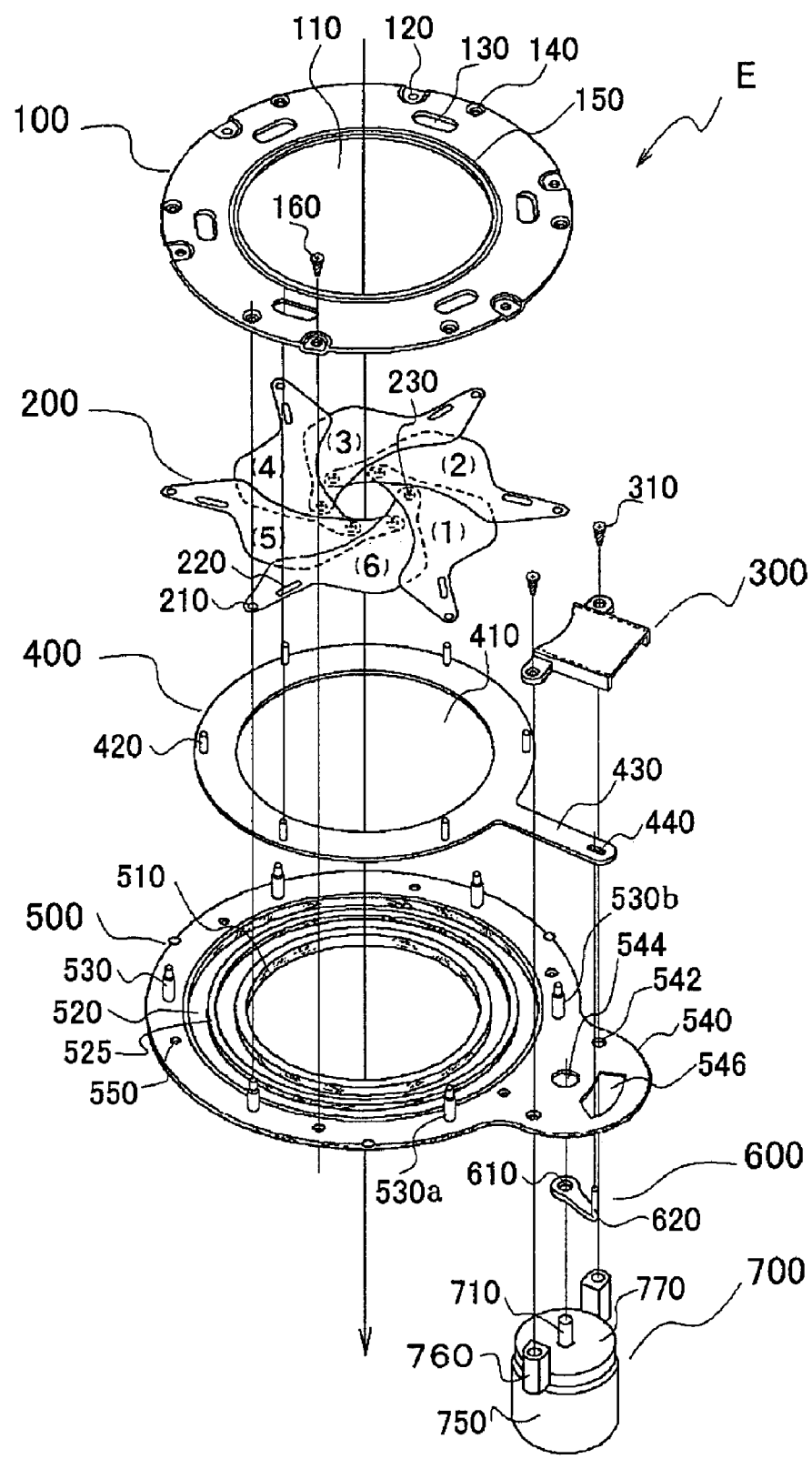
FIG. 4 is an exploded perspective view of the light quantity adjusting device shown in FIG. 3.

Here will be described a process for assembling the light quantity adjusting unit, as shown in FIG. 4, which is formed of six blade members. At first, the ring plate 400 is fitted and set in the groove 520 of the bottom plate 500 at the state position shown in FIG. 4. The first light quantity adjusting blade member (1) of the light quantity adjusting means 200 is placed over the ring plate 400 by fitting the fitting hole 210 on the fulcrum pin 530 of the bottom plate 500, as positioned at the confronting position, and by fitting the slit 220 on the operation pin 420 of the ring plate 400. Likewise, the second light quantity adjusting blade member (2), the third light quantity adjusting blade member (3), the fourth light quantity adjusting blade member (4) and the fifth light quantity adjusting blade member (5) are laid sequentially in the recited order over the first light quantity adjusting blade member (1). Likewise, the sixth light quantity adjusting blade member (6) is laid over the fifth light quantity adjusting blade member (5) such that its leading end goes below the light quantity adjusting blade member (1).

Specifically, in the case of the construction of the six light quantity adjusting blade members, as shown in FIG. 4, the first blade (1) is supported at its root end portion on a fulcrum pin 530*a* on the bottom plate (or substrate) 500 so that its leading end portion confronts the optical path opening 510. Next, the second blade (2) is supported on the fulcrum pin 530*b* so that its leading end confronts the optical path opening 510. At this time, the inner side edge portion of the second blade is laid over the outer side edge portion of the second blade (as referred to FIG. 4). Likewise: the third blade is laid over the second one; the fourth blade is laid over the third one; and the fifth blade is laid over the fourth one. Moreover, the inner side edge portion of the last sixth blade (6) is laid over the fifth one, and the outer side edge portion of the same is laid below the first blade. Of the blades thus sequentially laid up, the last blade is laid at its one side edge below the first blade so that the plural blades are combined and bound in the bundled state. Even when an external force such as an impact is exerted on the apparatus, there is no fear that the blades may flutter to admit any light from the clearances between the blades.

Next, the presser plate 100 is fastened downwardly in the shown state at its six portions by means of stop screws 160 thereby to complete the light quantity adjusting unit. Specifically, the individual blade members are supported between the bottom plate 500 and the presser plate 100 to be freely opened/closed (or turned) so that the base plate is constructed of the individual flat members, i.e., the bottom plate 500 and the presser plate 100.

A process for assembling the drive motor 700 will be described with reference to FIG. 5. First of all, the rotor, which is inserted in advance by insert-molding the spindle 710 and the inter-molded magnet rotor 720, is rotatably enveloped by the vertically or transversely halved coil frame 730 having the conductive coil 740 wound in the outer circumference groove, and the yoke 750 is fitted between the cover 770 and the cover 780. After this, the activation lever 600 is fitted and fixed at the proper position of the spindle 710 thereby to complete the drive motor 700.

As shown in FIG. 4, the operation pin 620 of the activation lever 600 attached to the drive motor 700 is fitted in the slit 440 of the ring plate 400, which is positioned at the supporting portion 540 of the bottom plate 500 for supporting the drive motor 700. At the same time, the protective cover 300 is mounted and fixed from the opposite face, which confronts the ring plate 400 with respect to the supporting portion 540, on the bottom plate 500 together with the fixed portion 760 of the drive motor 700 by means of the stop screws 310, thereby to complete the light quantity adjusting device shown in FIG. 5.

In the invention, therefore, the aforementioned blade members are mounted on the bottom plate 500 in the following manner to establish the smooth operations at the time when the blades are opened/closed. Specifically, at least one of the bottom plate 500 forming the aforementioned substrate and the presser plate 100 is provided with a guide surface for regulating (or guiding) the motions of the blades, so that the blades may be opened/closed along the guide surface.

Moreover, the guide surface includes a first guide surface formed on the circumferential edge (or near) the fulcrum pin, and a second guide surface formed on the circumference edge portion of the aforementioned optical path opening thereby to form such a level difference that one guide surface is higher than the other in a direction perpendicular to that of the optical path. The level difference is made by forming the substrate surface into a sloped plane or a stepped plane. As a result, each blade member is opened/closed at an inclination of a predetermined angle with respect to the direction of the optical path.

Figure 6A:
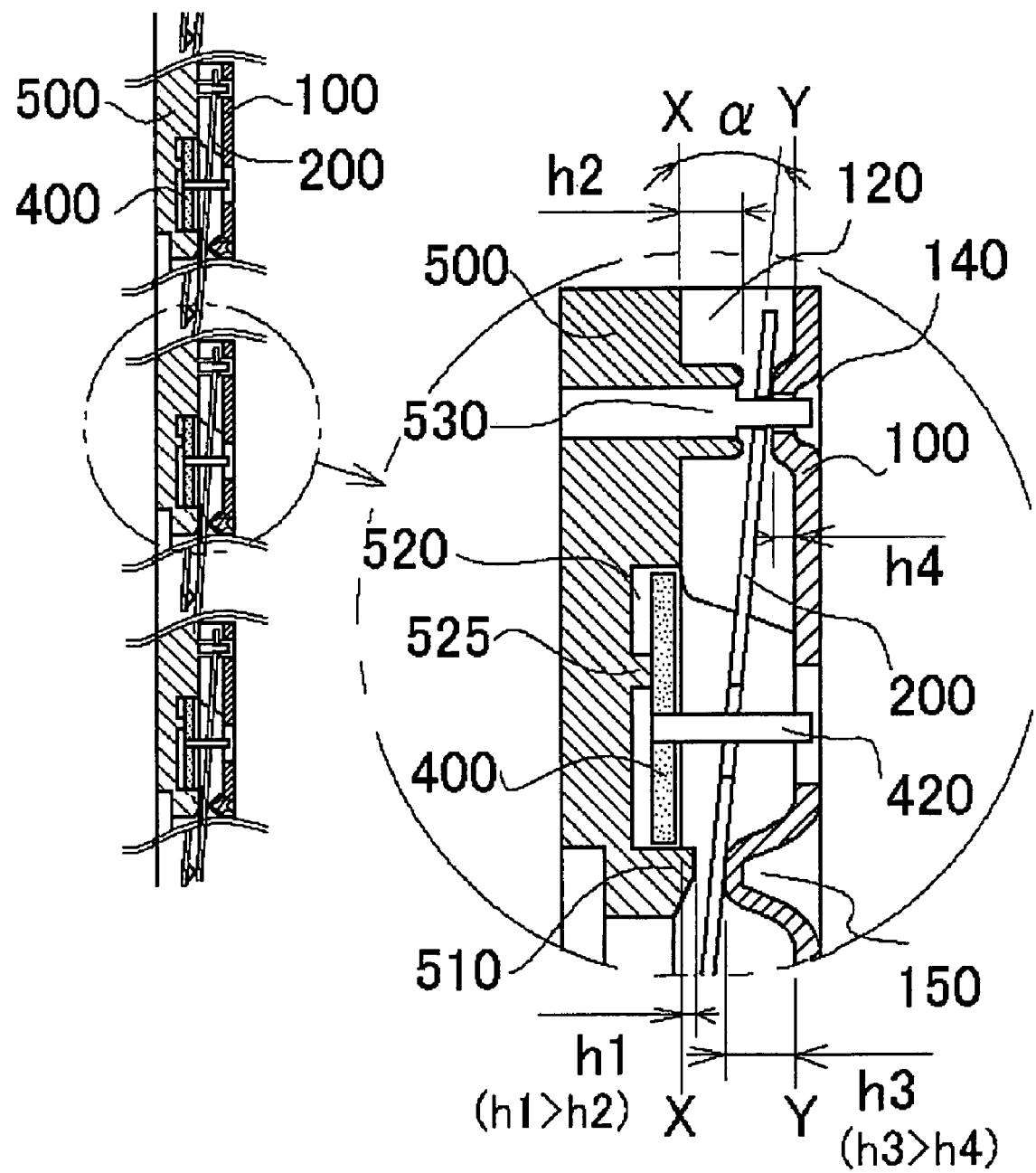
FIG. 6(a) is a partially enlarged view of the light quantity adjusting device shown in FIG. 5.

Therefore, when one of the first guide surface and the second guide surface is formed at a higher level on the bottom plate and the presser plate, the other is formed at a lower level. The assembled state of the light quantity adjusting means 200 will be explained with reference FIG. 6(a). At first, a leading end portion of the circumference edge portion of the groove 520 forming the optical path opening 510 contacting the light quantity adjusting means 200 protrudes by a height h1 with respect to the plane reference X—X of the bottom plate 500, and a step portion of the portion, in which the fulcrum pin 530 is embedded contacting the light quantity adjusting means 200 protrudes by a height h2 (h2>h1) with respect to the plane reference X—X.

On the other hand, a leading end portion of a regulating protrusion 150 confronting the protruding leading end portion of the circumference edge portion of the bottom plate 500 and formed by a drawing contacting the light quantity adjusting means 200 protrudes by a height h3 with respect to a plane reference Y—Y of the presser plate 100 in parallel with the plane reference X—X, and a leading end portion of the relief hole 140 fitting the fulcrum pin 530 and formed by a drawing contacting the light quantity adjusting means 200 protrudes by a height h4 (h4>h3) with respect to the plane reference Y—Y.

Here, an arbitrary plane is determined if three points are given. The first point for determining the plane of each light quantity adjusting blade member is located at the step portion of the portion, in which the fulcrum pin 530 contacting the blade member is embedded; the second point is located at a protruding leading end portion of the circumference edge portion of the bottom plate 500 contacting the edge portion of the same blade member; and the third point is located at an edge portion of the same blade member contacting the plane of the blade member on the closer side.

Figure 6B:
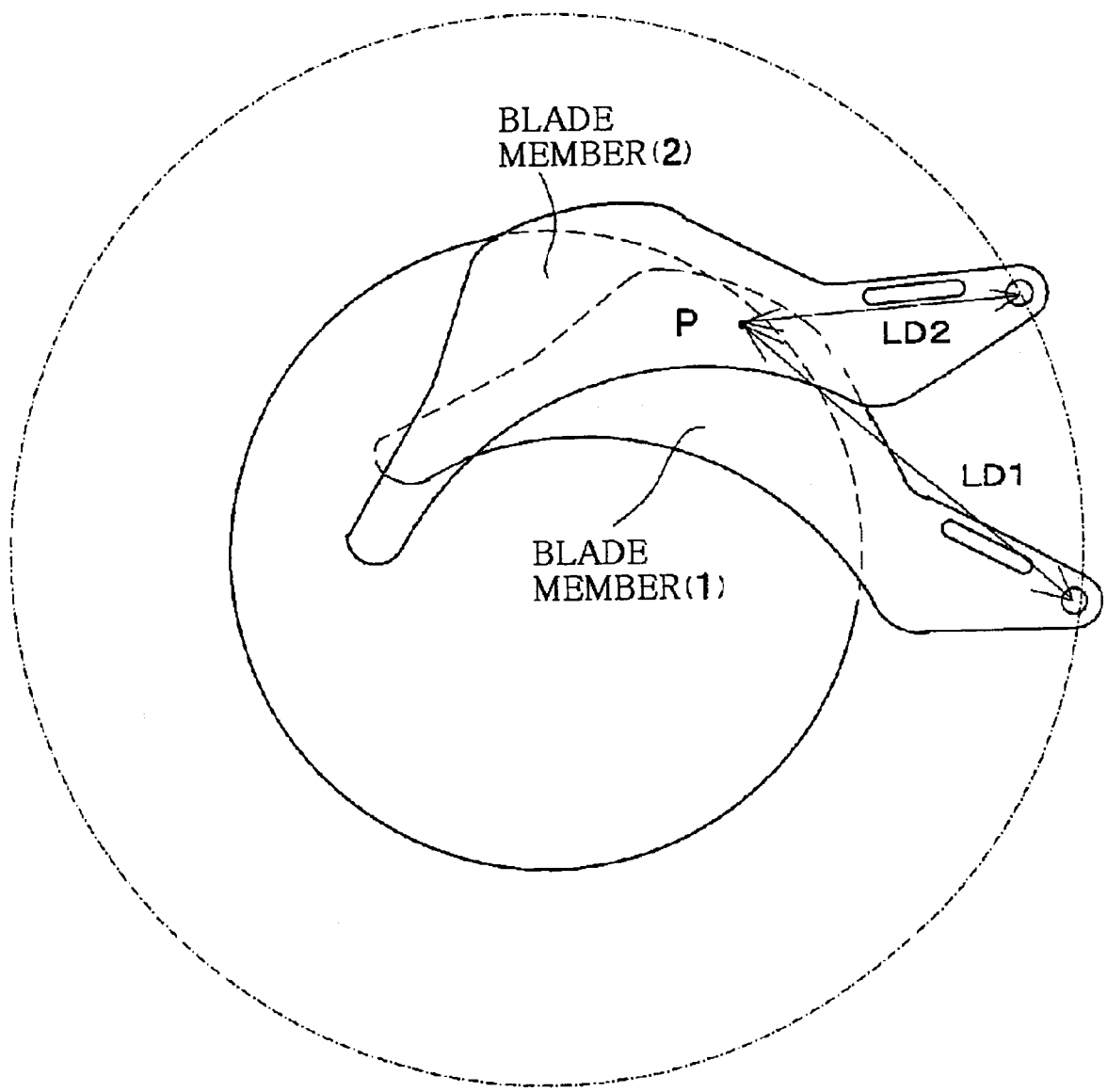
FIG. 6(b) is an explanatory view showing blade members of the light quantity adjusting device shown in FIG. 5 in an overlapped state.
Figure 6C:
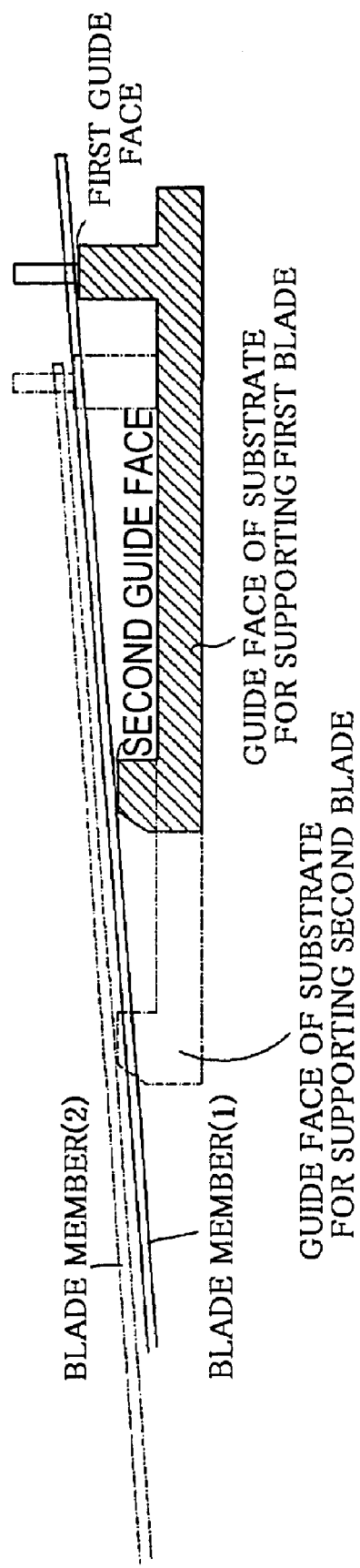
FIG. 6(c) is an explanatory view showing the blade members in the overlapped state.

Therefore, the individual light quantity adjusting blade members of the light quantity adjusting means 200 are set at positions on the bottom plate 500 such that they are inclined at an equal absolute angle α in different directions, so that they turn on the individually different planes. As a result, the six light quantity adjusting blade members of the light quantity adjusting means 200 turn without any contact while being held with a space, although not equal, as shown in FIG. 6(b), so that their contacting portions can be drastically reduced to suppress the noise which might otherwise be caused when their surfaces contact and rub each other.

Figure 7A:
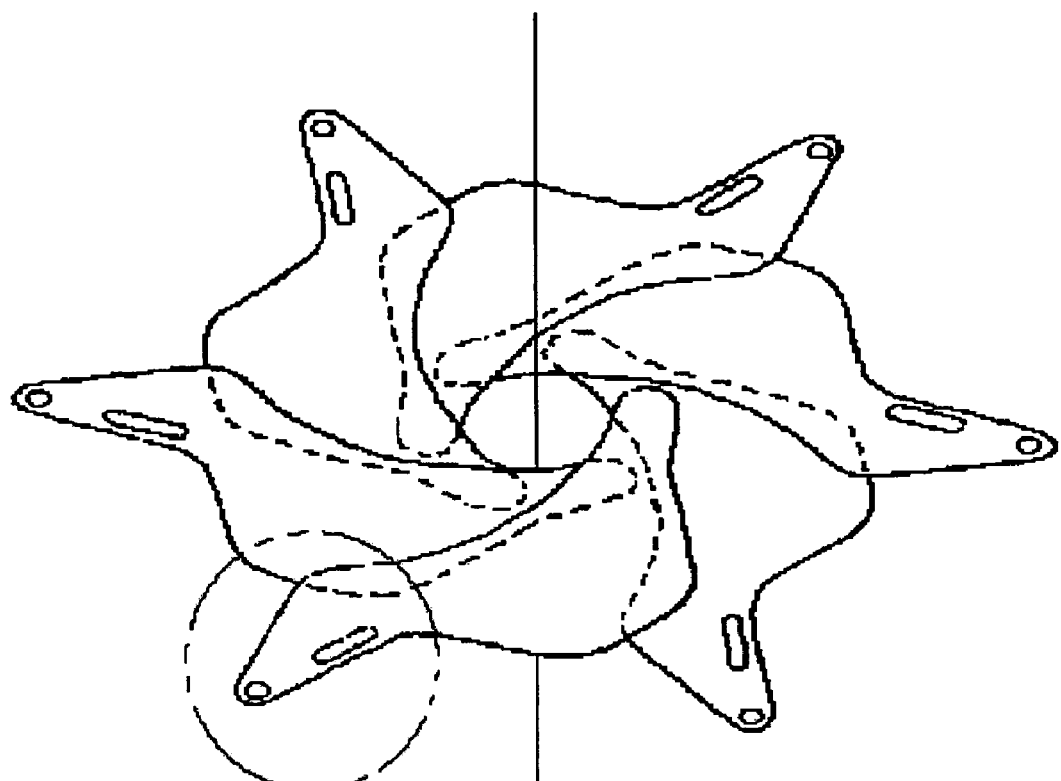
FIG. 7(a) is an explanatory view showing the blade members in the overlapped state, and FIG. 7(b) a partial sectional view thereof.
Figure 7B:
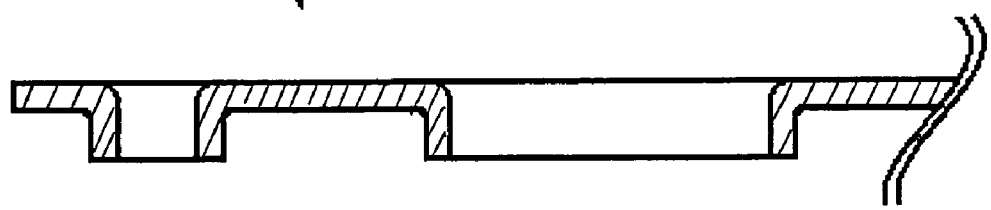

Next, the light quantity adjusting blade member of the light quantity adjusting means 200 will be described with reference to FIGS. 7(a) and 7(b). The light quantity adjusting blade member is punched by pressing a thin metal sheet of a material of stainless steel or SK. At this time, the fulcrum pin 530 of the bottom plate 500 and the fitting hole 210, and the operation pin 420 of the ring plate 400 and the slit 220 are fitted to slide relative each other so that either the fulcrum pin 530 or the operation pin 420 of the ring plate 400 contact the pressed broken face of the blade member to be shaped thereby to deteriorate the durability.

Therefore, the hole is burred, as shown, to eliminate the direct contact of the pressed broken face with the fulcrum pin 530 of the bottom plate 500 and the operation pin 420 of the ring plate 400 and to enlarge the contact area so that the contact portions can be made hard to wear thereby increase the durability.

Figure 8A:
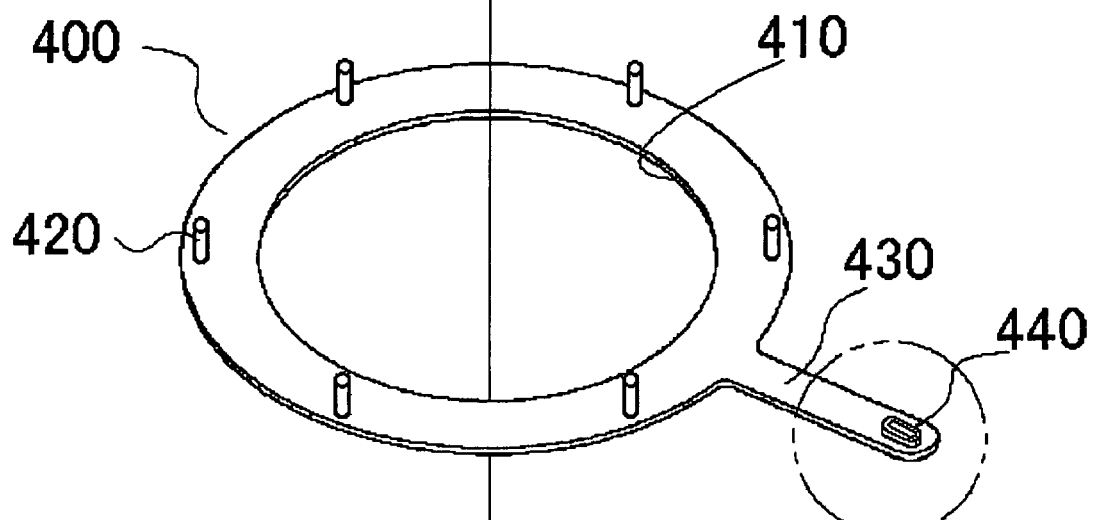
FIG. 8(a) is a perspective view showing a transmission member of the light quantity adjusting device shown in FIG. 3.
Figure 8B:
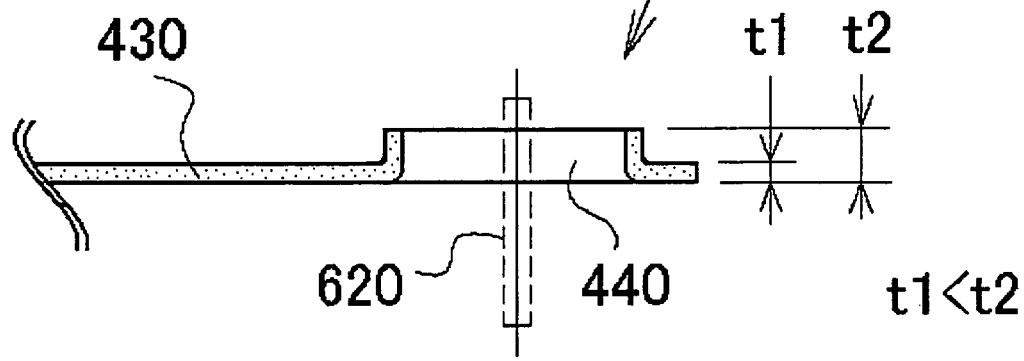
FIG. 8(b) is a sectional view of a slit of the transmission member.
Figure 8C:
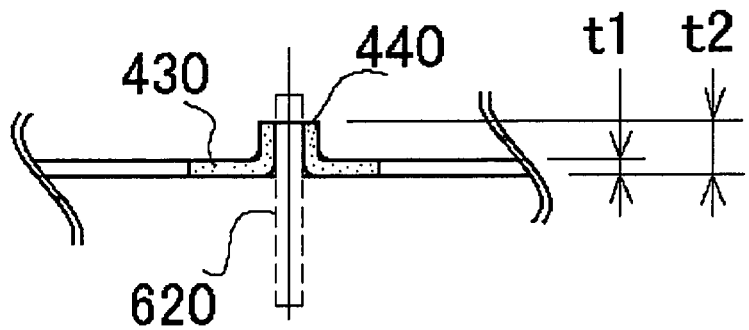
FIG. 8(c) is a sectional view showing another slit of the transmission member.

Here will be explained the shape of the slit 440 of the ring plate 400 shown in FIGS. 8(a) to 8(c). The ring plate 400 is formed of an aluminum sheet. At this time, the slit side portion of the slit 440 is burred to make a sheet thickness t1 corresponds to a sheet thickness t2 (t1<t2). By this working, the contact area of the slit 440 with the operation pin 620 of the activation lever 600 can be enlarged so that the operation pin 620 can become hard to wear at the side end face of the slit 440 even with the rubbing motions at the operation time thereby to increase the durability.

Figures 9A, 9B:
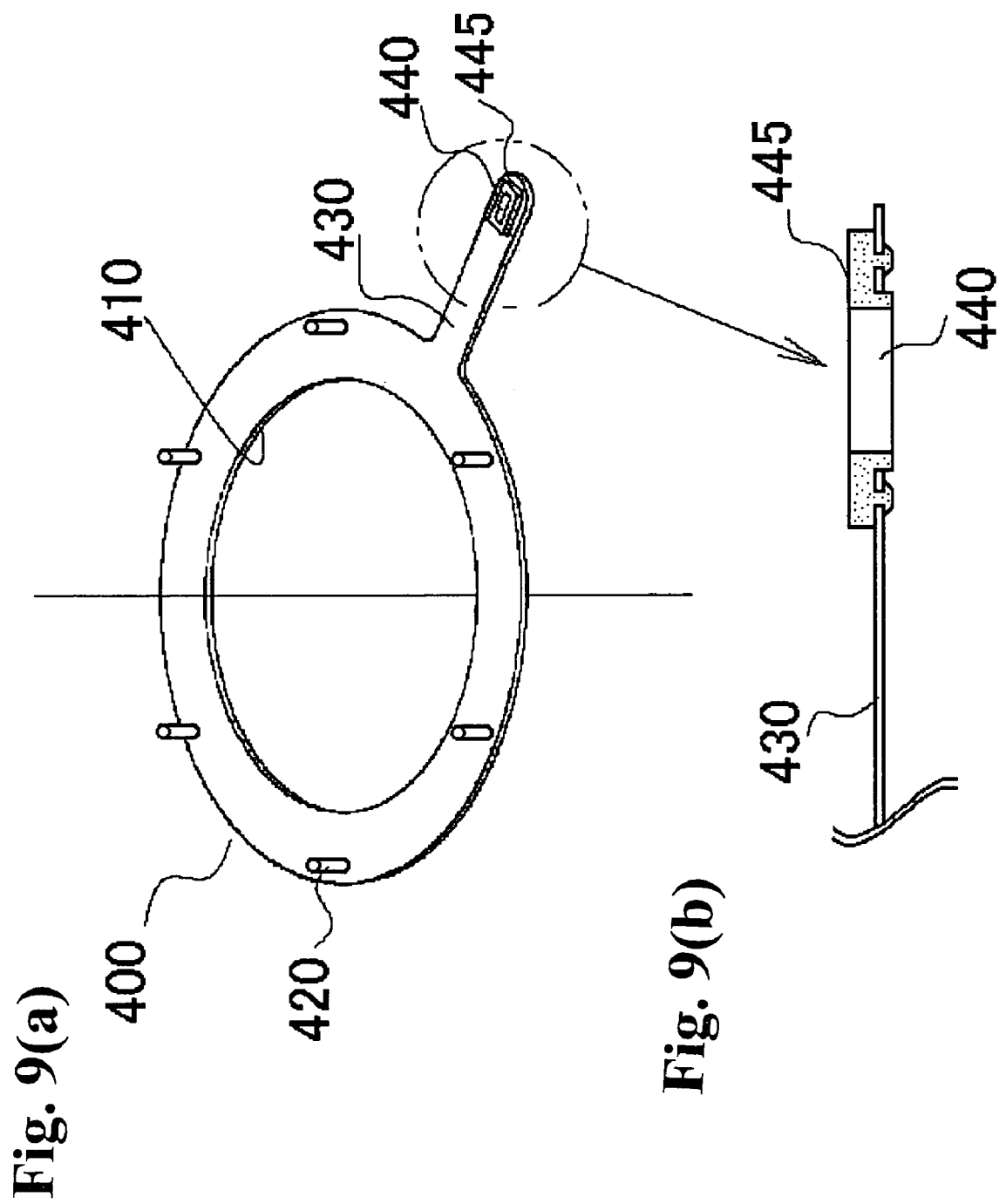
FIG. 9(a) is a perspective view showing another transmission member different from that shown in FIG. 8(a)
FIG. 9(b) is a sectional view thereof.

On the other hand, FIGS. 9(a) and 9(b) show an embodiment different from that of FIG. 8. The embodiment shown in FIGS. 9(a) and 9(b) is different in that the slit 440 of the ring plate 400 is pressed larger, and that a slit aiding member 445 molded of a hard resin is integrally fixed in the slit 440. Not the metal-metal relation but the resin-metal relation of the slit aiding member 445 protects the operation pin 620 against the rubbing operation so that the durability is further enhanced.

Figure 10:
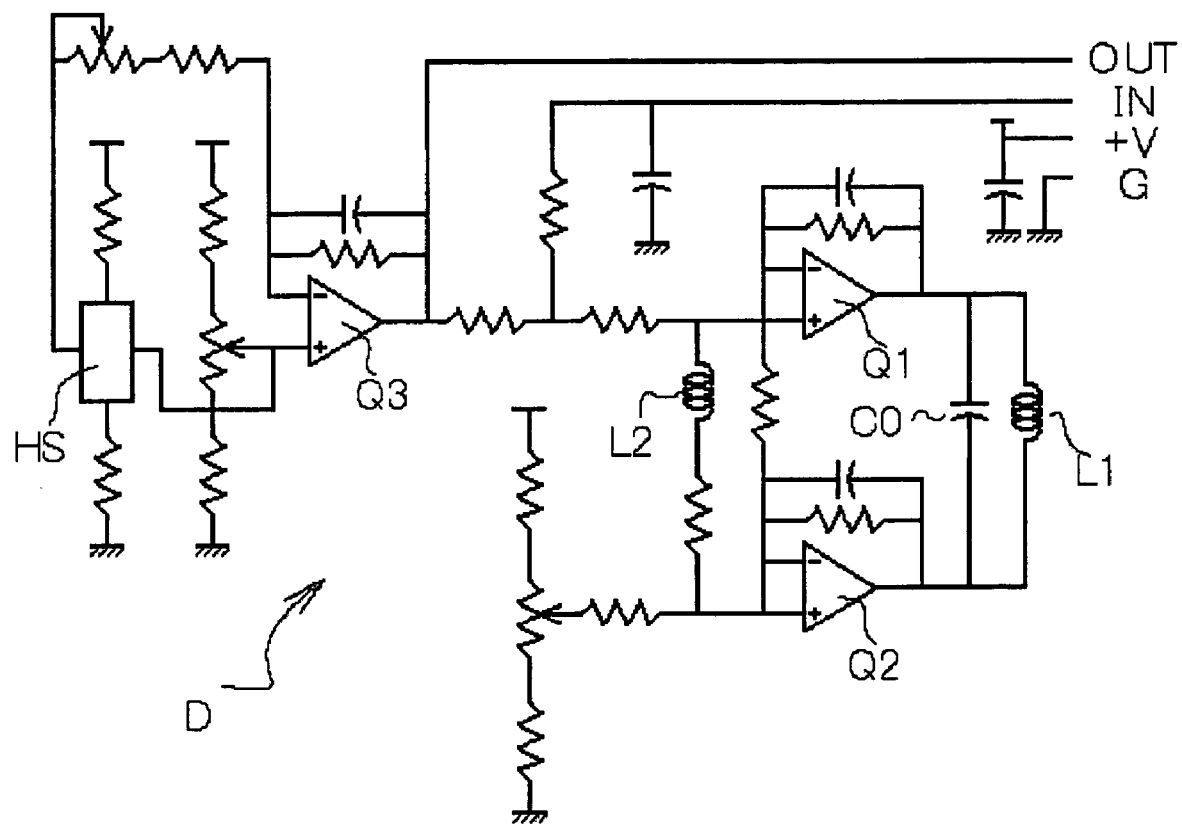
FIG. 10 is a circuit diagram of a light quantity adjusting circuit for driving the light quantity adjusting device according to an embodiment of the present invention.
Figure 11:
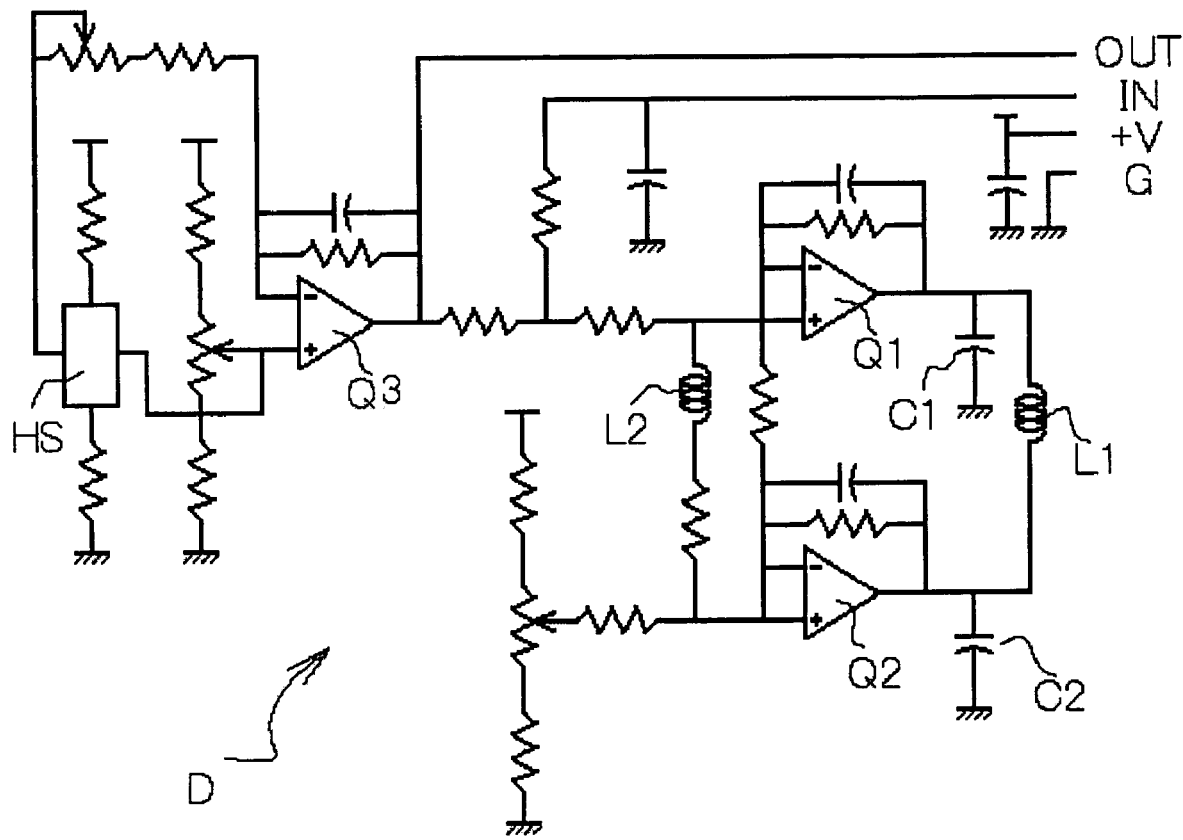
FIG. 11 is a circuit diagram of a light quantity adjusting circuit for driving the light quantity adjusting device according to another embodiment of the present invention.

Next, a control circuit for driving the light quantity adjusting device will be explained. FIG. 10 is a circuit diagram of a light quantity adjusting circuit for driving the light quantity adjusting device according to an embodiment of the present invention. FIG. 11 is a circuit diagram of a light quantity adjusting circuit for driving the light quantity adjusting device according to another embodiment of the present invention.

At first, the description is made on the circuit configuration of the light quantity adjusting circuit D of the light quantity adjusting device E with reference to FIG. 10. In FIG. 10: symbol IN designates an input terminal for a light quantity adjusting signal outputted from a not-shown control circuit of the projector; symbol OUT designates an output terminal of a light quantity adjusting level signal according to the light quantity adjusting level at the operation time of the light quantity adjusting device E; symbol +V designates an applied voltage of the light quantity adjusting circuit D; symbol G designates a grounding terminal; symbols Q1 to Q3 designate differential amplifiers; symbol HS designates a Hall element arranged at a position to confront the magnet rotor 720 of the drive motor 700 in the light quantity adjusting device E shown in FIG. 5 for detecting the light quantity adjusting position from the change in the magnetic characteristics of the rotational position of the magnet rotor 720; symbol L1 designates the drive coil, as has been explained in FIG. 5; characters L2 designate the brake coil; and symbol C0 designates a capacitor (a bypass filter or high-pass filter) connected between the two ends of the drive coil L1 for suppressing the change just after the start of the feed of the drive current to the drive coil L1 thereby to lower the light quantity adjusting rate of the light quantity adjusting device E. The remaining resistors and capacitors may be individually arranged at such suitable positions to activate the light quantity adjusting circuit D properly.

Next, a circuit configuration of the light quantity adjusting circuit D of the light quantity adjusting device E according to another embodiment is explained with reference to FIG. 11. The circuit configuration shown in FIG. 11 is different from that of FIG. 10 in that the capacitor C0 (a bypass filter or high-pass filter) connected between the two ends of the drive coil L1 for suppressing the change just after the start of the feed of the drive current to the drive coil L1 thereby to lower the light quantity adjusting rate of the light quantity adjusting device E is replaced by capacitors C1 and C2 (bypass filters or low pass filters), which are connected between the individual ones of the two ends of the drive coil L1 and the ground G for suppressing the change just after the start of the feed of the drive current to the drive coil L1 thereby to lower the light quantity adjusting rate of the light quantity adjusting device E. However, these two circuit configurations are hardly different in the light quantity adjusting rate of the light quantity adjusting device E.

Here will be described the drive control of the light quantity adjusting device E. At first, the light quantity adjusting signal for adjusting the quantity of light of the image to be projected is inputted from the control circuit of the projector H to the input terminal IN. On the other hand, a light quantity adjusting level signal of the light quantity adjusting device E at that time is detected by the Hall element HS and is amplified and outputted by the operation amplifier Q3.

As a result, the two light quantity adjusting signal and light quantity adjusting level signal are compared at a circuit node E1, and the positive or negative drive current according to the potential difference and corresponding to the potential difference between the operation amplifier Q1 and the operation amplifier Q2 flows into the drive coil L1 to activate the drive motor 700 shown in FIG. 5. At this time, depending on the magnetic characteristics changing with the rotation of the magnet rotor 720 to the brake coil L2, the braking current according to the change flows into the brake coil L2 thereby to brake the rotation of the magnet rotor 720 and to change the detected output of the Hall element HS. When the aforementioned potential difference at the circuit node E1 disappears, the rotation of the drive motor 700 stops so that the proper light quantity adjustment is made.

At this drive, the change just after the start of the drive current feed to the drive coil L1 is suppressed by the capacitor C0 (a bypass filter or the high-pass filter) connected between the two ends of the drive coil L1. Accordingly, the rotation of the drive motor 700 is suppressed just after the drive start thereby to decelerate the light quantity adjusting rate of the light quantity adjusting device E. This deceleration reduces the noise, which might otherwise be caused by the looseness of the joint portions among the bottom plate 500, the light quantity adjusting means 200, the ring plate 400 and the drive arm 600 or their impact at the contacting time.

Here will be described light quantity control in the case that the light quantity adjusting device is adopted in the projector apparatus shown in FIG. 2. The aforementioned light quantity adjusting means may be controlled to adjust the light quantity according to brightness of environment, in which it is employed, or luminance change of consecutive projected images. When the light quantity is adjusted according to the brightness of the environment, the projector apparatus is provided with a photoelectric sensor such as a line sensor or a CCD sensor for detecting the ambient light.

For the mounting position of the photoelectric sensor, there is adopted either a method, in which the sensor is mounted on the outer case of the projector apparatus thereby to detect the brightness of the room, or a method, in which a test image having a predetermined luminance is projected on the screen so that the light reflected from the screen may be detected by the photoelectric sensor built in the projector.

Moreover, the light quantity adjustment is performed on the basis of the quantity of light, which is electrically detected by the photoelectric sensor. For example, the detected value of the ambient light is compared with a predetermined reference value, and a reduction in the light quantity is calculated by an operation circuit such as a CPU, so that the light quantity adjusting signal is transmitted to the light quantity adjusting device. In a case that the light quantity adjustment is performed according to the change in the luminance of the projected image, on the other hand, the luminance is calculated from the image signal transmitted to the aforementioned image forming unit and is compared with a reference value, so that the light quantity adjusting signal is transmitted to the light quantity adjusting device.

In the light quantity adjusting device, the electric current is applied to the exciting coil (i.e., the drive coil and the brake coil) described above, so that the blade members move to predetermined positions. In the invention, the plural blade members are individually arranged at an equal spacing or at a predetermined spacing in the optical path opening of the substrate (i.e., the aforementioned bottom plate and presser plate), so that they can turn around their root end portions on the fulcrum pins. Thus, the blade members turn along their guide surfaces formed on the substrate.

By these turns, the leading end portions of the individual blade members confront the optical path opening to enlarge or reduce the aperture. At this time, the individual blade members are arranged such that the first order blade member is overlaid by the second order blade member while their adjoining edge portions are overlapped, and such that the last order blade member likewise overlaid is assembled at its leading end below the first (order) blade member. At the same time, in the shown embodiment, the substrate for supporting the individual blade members is provided with the blade guide surfaces having the slopes or steps of the level differences in the direction perpendicular to the optical path, so that the individual blade members turn along the guide surfaces while being inclined at the predetermined angle.

At first, therefore, the individual blade members establish small clearances in between when they turn along the blade guide surfaces. In a case that the first and second blade members adjoining each other move along the guide surfaces inclined at the equal angle ($\alpha$), the overlapped state of the blades is as follows.

Thee first and second blade members are supported on the fulcrum pins spaced at the predetermined spacing on the circumferential edge of the optical path opening with their adjoining edge portions overlapped, so that the overlapped portions are positioned at different distances from their individual fulcrum pins.

As shown in FIG. 6(b), therefore, at the overlapped portion P, the first blade member (1) is positioned at LD1×sin $\alpha$, and the second blade member (2) is positioned at LD2×sin $\alpha$. Because of LD1≠LD2, the clearance of (LD1−LD2)×sin $\alpha$ is formed between the blades at the overlapped position P. Thus, the overlapped state of the blades can be controlled by optimizing the level differences of the blade guide surfaces and the positional relation between the overlapped portion of the adjoining blade members and the fulcrum.

Figure 12:
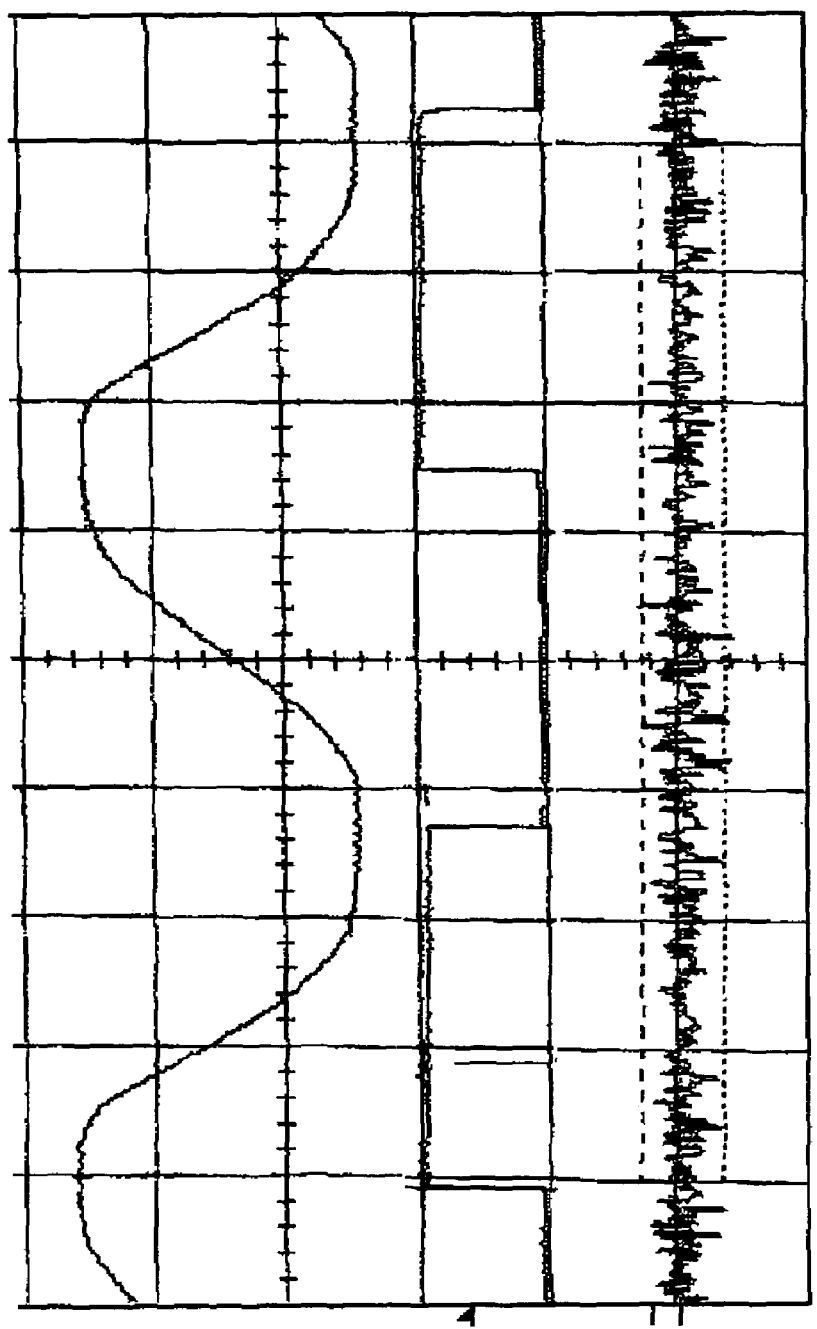
FIG. 12 is a chart showing an operational characteristic of the light quantity adjusting device according to the embodiment of the present invention.

The overlapped state of the blades is described with reference to FIG. 12 to FIG. 15. FIG. 12 a chart showing an operational characteristic of the light quantity adjusting device according to the embodiment of the present invention, in which the blades are opened/closed with the inclination due to the level differences of the guide surfaces formed on the substrate.

Figure 13:
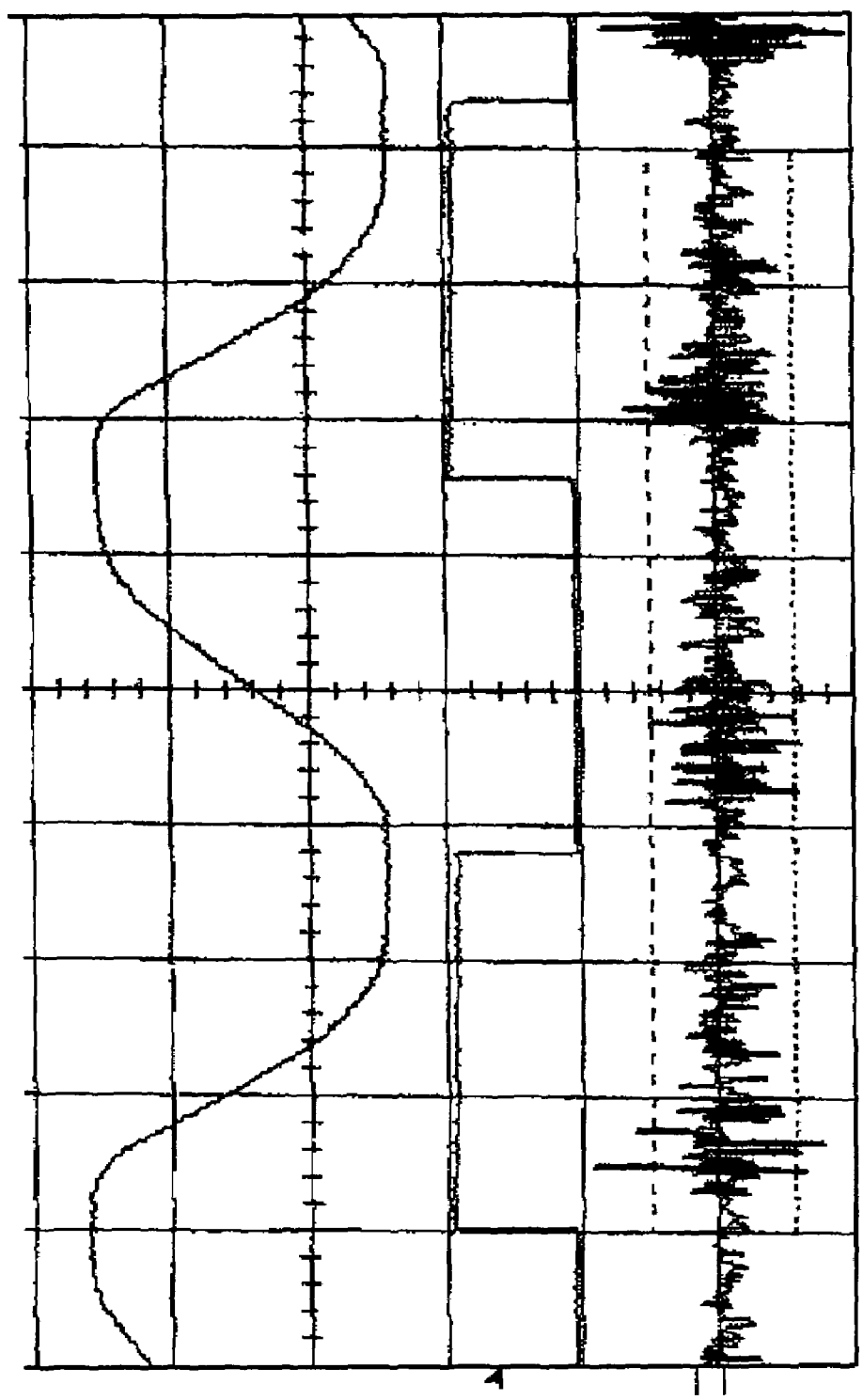
FIG. 13 is a chart showing an operational characteristic of a conventional light quantity adjusting device.

FIG. 13 is a chart showing an operational characteristic of a conventional light quantity adjusting device, in which the blades are sequentially overlaid due to no level difference on the guide surfaces of the substrate. FIG. 13 is a chart showing a noise level when the blades are moved from the opened state to the closed state and moved again from the closed state to the opened state. An enlarged noise level is shown in FIG. 14 at the movement from the opened state to the closed state, and in FIG. 15 from the closed state to the opened state.

Figure 14:
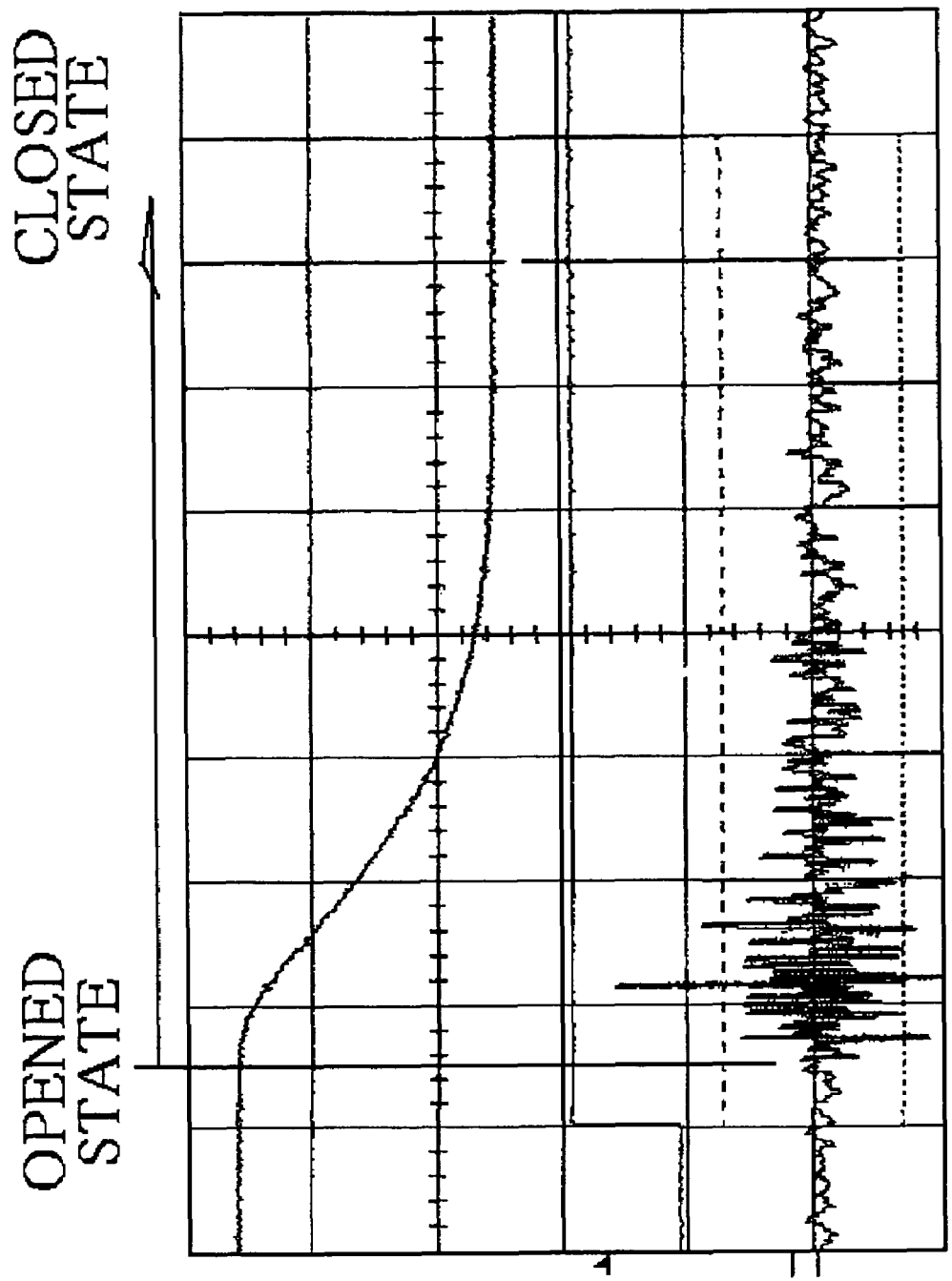
FIG. 14 is an enlarged chart of the operational characteristic of the light quantity adjusting device shown in FIG. 13.
Figure 15:
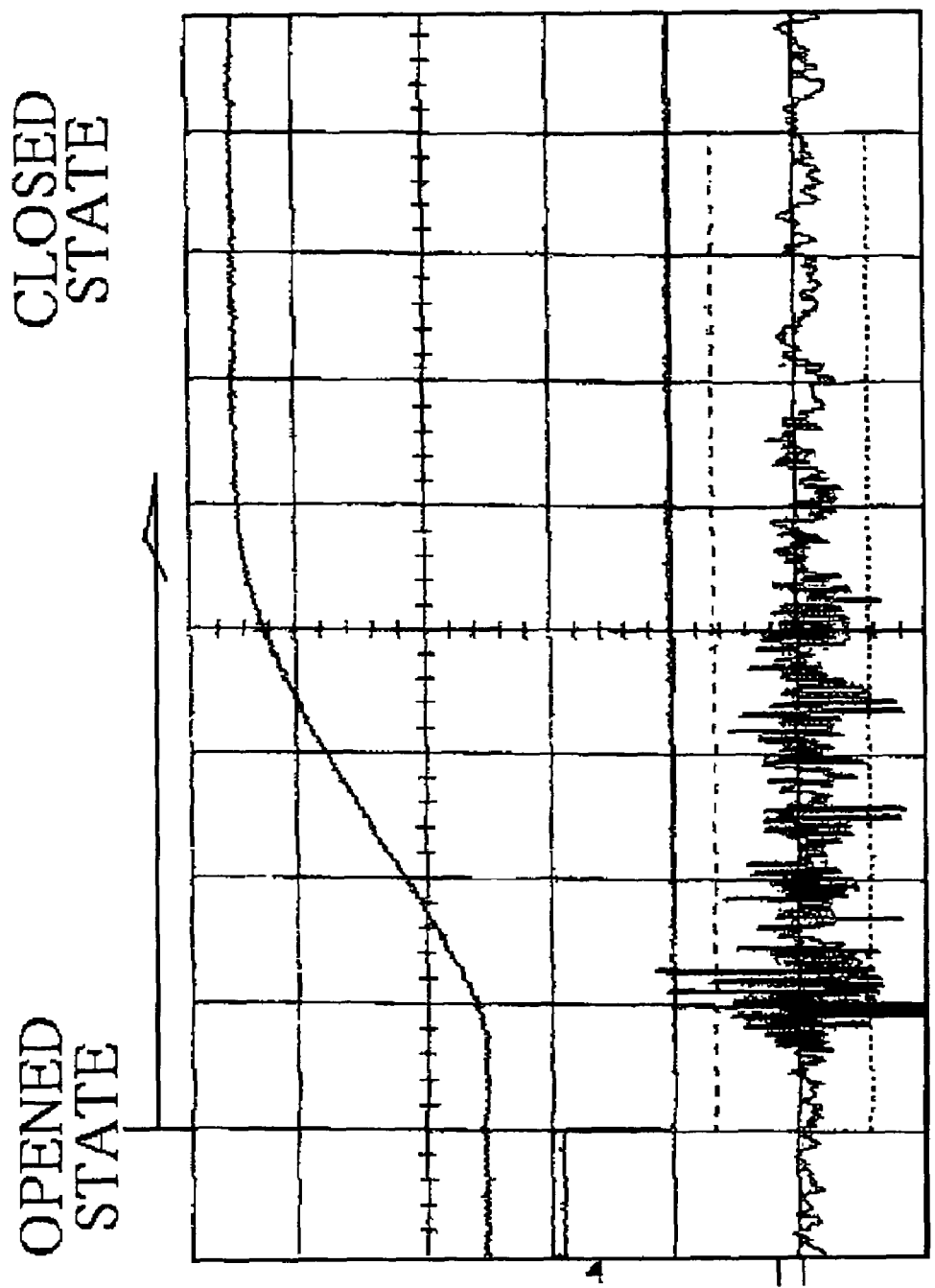
FIG. 15 is an enlarged chart of the operational characteristic of the light quantity adjusting device shown in FIG. 13.

From FIG. 14 and FIG. 15, it is apparent that the operation sound is detected as the noise when the blade members are moved in the opening direction or in the closing direction, and that a large sound is generated at the time of starting the moving operation.

On the contrary, as shown in FIG. 12, it is confirmed that when the blades are overlapped, any noise is generated in either the opening direction or the closing direction.

According to the invention described above, the substrate having the optical path opening to confront the optical path is provided with the blade guide surfaces, which have the level differences to turn the individual blade members at the inclination of the predetermined angle longitudinally of the optical axis direction when the blade members are overlapped and supported in the freely opened/closed manners. As a result, the overlapped blade members establish the clearances in between, when they turn on the fulcrum pins mounted on the substrate, thereby to reduce the frictions in between. Therefore, the blade members can be opened and closed rapidly and smoothly, thereby reducing the operation sound when they rub each other.

Moreover, the blade members hardly cause the wear or malfunction even if they are rapidly opened and closed. In the invention, the response and the operation sound of the opening/closing operations of the blade members can be optimized by properly selecting the inclination angles of the blade guide surfaces and the distances (or the positional relations) from the turning fulcrum pins (or the positions of the fulcrum pins) of the individual blade members to the contacting portions between the blades.

According to the invention, moreover, when the plural blade members for adjusting the optical path opening to the large and small apertures are sequentially overlapped at their outer peripheral portions, the second blade is laid over the first one, and the last laid blade is assembled at its leading end below the first blade, so that the plural blades are integrally assembled. The blades do not flutter even with a careless impact, so that they are not broken by their interference nor admit any unnecessary light from the clearances between the overlapped blades. The invention has a remarkably high effect if it is combined with a structure, in which small clearances are formed by protrusions or slopes between the overlapped blades.

In the invention, moreover, the electric energy to be fed to the exciting coil for opening/closing the blade members confronting the optical path opening is gradually increased. As a result, the blades start their movements with slow operations and then move at the predetermined high speed. It is, therefore, possible to reduce an operation sound of the blades that might otherwise be generated at the operation starting time of the most serious influence of inertia.

The disclosures of Japanese Patent Applications No. 2004-161063 filed on May 31, 2004, No. 2004-161064 filed on May 31, 2004, and No. 2004-161065 filed on May 31, 2004, are incorporated in the application.

While the invention has been explained with reference to the specific embodiments of the invention, the explanation is illustrative and the invention is limited only by the appended claims.

What is claimed is:

1. A light quantity adjusting device for adjusting light quantity of a projector apparatus, comprising:
   a substrate having an optical path opening and arranged in a direction substantially perpendicular to an optical path of the projector apparatus, said substrate having a blade guide surface with a level difference in a direction perpendicular to the optical path,
   a plurality of blade members arranged at a circumferential edge of the optical path opening with a predetermined space therebetween and overlapped with each other, said blade members rotating along the blade guide surface in a state inclined by a predetermined angle with respect to the optical path,
   a plurality of pins disposed on the substrate for supporting base end portions of the blade members so that the blade members rotate around the base end portions and leading end portions of the blade members open and close the optical path opening,
   a transmission member mounted on the substrate for engaging the blade members to provide open-close operations, and
   a drive device for driving the transmission member to rotate the blade members to open and close the optical path opening.

2. A light quantity adjusting device according to claim 1, wherein said blade guide surface includes a first guide surface formed at circumferential edge portions of the pins and a second guide surface formed at a circumferential edge portion of the optical path opening, said first guide surface supporting the blade members at a position with respect to the optical path higher than that of said second guide surface supporting the blade members.

3. A light quantity adjusting device according to claim 1, wherein said substrate is formed of a pair of plate members having a small clearance therebetween for retaining the blade members, said blade guide surface being formed on each of the plate members.

4. A light quantity adjusting device according to claim 1, wherein each of said blade members is provided with at least one protrusion for forming a gap between the blade members.

5. A light quantity adjusting device according to claim 1, wherein said pins are arranged at an equal distance from a center of the optical path opening and at a substantially equal interval in a circumferential direction for supporting the blade members to rotate for enlarging and reducing an aperture of the optical path opening in a state that the blade members are overlapped with each other.

6. A light quantity adjusting device according to claim 1, wherein said blade members are arranged such that the blade members are overlapped with each other at positions having different distances from the pins.

7. A light quantity adjusting device according to claim 1, wherein said blade members include a first blade member through a last blade member, said blade members being overlapped such that the first blade member is overlapped under a second blade member and said last blade member is overlapped below the first blade member.

8. A light quantity adjusting device according to claim 1, wherein said transmission member includes a ring-shaped member rotatably supported on the substrate at an outer circumference of the optical path opening and engaging each of the blade members, said drive device rotating the transmission member by a predetermined amount, one of said drive device and said transmission member having a stopper for regulating movement of the blade members.

9. A light quantity adjusting device according to claim 1, wherein said pins include first pin members formed on the substrate and said transmission member includes second pin members for engaging the blade members, said blade members having holes for engaging the first pin members and slits for engaging the second pin members, said blade members being formed of a metal sheet material, said holes and said slits being formed with burring.

10. A light quantity adjusting device according to claim 1, wherein said transmission member includes a slit for engaging the drive device and is formed of an aluminum alloy or another metal material, said slits being formed with burring.

11. A light quantity adjusting device according to claim 1, wherein said transmission member includes a slit for engaging the drive device and is formed of a metal material, said slit being formed with a resin material.

12. A light quantity adjusting device according to claim 1, wherein said drive device includes a magnet rotor connected to the blade members for opening and closing the same, an exciting coil for driving the magnet rotor to rotate, and a power control circuit for feeding an electric power to the exciting coil, said power control circuit having a control unit for gradually increasing the electric power.

13. A light quantity adjusting device according to claim 12, wherein said control unit includes a current control circuit for gradually increasing a current to the exciting coil.

14. A light quantity adjusting device according to claim 12, wherein said control unit includes a capacitor circuit bypass-connected to an input terminal for supplying the electric power to the exciting coil.

15. A light quantity adjusting device according to claim 12, wherein said control unit includes two capacitor circuits bypass-connected between two input terminals for supplying the electric power to the exciting coil and ground.

16. A projector apparatus comprising:
   an image forming device for forming an image,
   a light source for irradiating light to the image forming device,
   a projection device for projecting light from the image forming device, and
   the light quantity adjusting device according to claim 1 arranged in the optical path from the light source to the projection device for adjusting quantity of light.

17. A projector apparatus according to claim 16, wherein said light quantity adjusting device includes a control unit for opening and closing the blade members in response to a change in luminance of the image formed by the image forming device.

18. A projector apparatus according to claim 16, wherein said blade members include a first blade member through a last blade member, said blade members being arranged such that the first blade member is overlapped under a second blade member and the last blade member is overlapped below the first blade member.

19. A projector apparatus according to claim 16, further comprising a mask member arranged in the optical path between the light source and the image forming device for forming the light from the light source into a suitable contour shape.

20. A projector apparatus according to claim 16, wherein said drive device includes a magnet rotor connected to the blade members for opening and closing the same, an exciting coil for driving the magnet rotor to rotate, and a power control circuit for feeding an electric power to the exciting coil, said power control circuit having a control unit for gradually increasing the electric power.

* * * * *